United States Patent
Kulkarni et al.

(10) Patent No.: US 9,990,693 B2
(45) Date of Patent: Jun. 5, 2018

(54) METHOD AND DEVICE FOR RENDERING MULTIMEDIA CONTENT

(71) Applicant: SONY CORPORATION, Tokyo (JP)

(72) Inventors: Ashwin D. Kulkarni, Bangalore (IN); Ananya Banik, Bangalore (IN); Uday Kiran Arcot, Bangalore (IN); Prashanth Puttamalla Setty, Bangalore (IN)

(73) Assignee: SONY CORPORATION, Tokyo (JP)

( * ) Notice: Subject to any disclaimer, the term of this patent is extended or adjusted under 35 U.S.C. 154(b) by 281 days.

(21) Appl. No.: 14/264,430

(22) Filed: Apr. 29, 2014

(65) Prior Publication Data
US 2015/0309709 A1    Oct. 29, 2015

(51) Int. Cl.
*G06T 3/40*    (2006.01)
*G06T 5/00*    (2006.01)

(52) U.S. Cl.
CPC .............. *G06T 3/40* (2013.01); *G06T 3/4092* (2013.01); *G06T 5/00* (2013.01); *G06F 2203/04806* (2013.01)

(58) Field of Classification Search
CPC ................................. G06T 3/4092; G06T 5/00
See application file for complete search history.

(56) References Cited

U.S. PATENT DOCUMENTS

| | | | |
|---|---|---|---|
| 6,519,050 B1 * | 2/2003 | Eintracht | H04N 1/62 358/1.15 |
| 7,589,778 B2 * | 9/2009 | Nakahira | H04N 3/1562 348/240.2 |
| 7,609,898 B2 * | 10/2009 | Ma | G06K 9/3241 382/232 |
| 7,773,121 B1 * | 8/2010 | Huntsberger | G08B 13/19626 348/143 |
| 8,446,529 B2 * | 5/2013 | Yokoyama | G09G 5/00 345/660 |
| 9,441,913 B1 * | 9/2016 | Donahoe | F41G 1/467 |
| 2003/0194207 A1 * | 10/2003 | Chung | G06F 17/30056 386/241 |
| 2004/0252340 A1 * | 12/2004 | Komagamine | H04N 1/3875 358/1.18 |

(Continued)

FOREIGN PATENT DOCUMENTS

| | | |
|---|---|---|
| CN | 102625147 A | 8/2012 |
| CN | 103258509 A | 8/2013 |

(Continued)

OTHER PUBLICATIONS

Office Action for CN Patent Application No. 201510198391.7, dated Sep. 19, 2017, 10 pages of Office Action and 12 pages of English Translation.

*Primary Examiner* — Ryan Pitaro
(74) *Attorney, Agent, or Firm* — Chip Law Group (57) ABSTRACT

Various aspects of a device and a method for rendering multimedia content are disclosed herein. The method determines a ratio between a first resolution of multimedia content and a second resolution of a display screen of a display device. At least one user input is received that selects a region of interest (ROI) on the multimedia content being rendered on the display screen. Based on the determined ratio, the selected ROI on the multimedia content being rendered on the display screen is dynamically modified based on the determined ratio.

18 Claims, 5 Drawing Sheets

(56) References Cited

U.S. PATENT DOCUMENTS

| | | | |
|---|---|---|---|
| 2006/0050090 A1* | 3/2006 | Ahmed | G09G 5/391 345/660 |
| 2006/0170793 A1* | 8/2006 | Pasquarette | H04N 5/23293 348/240.99 |
| 2008/0013783 A1* | 1/2008 | Yamade | G06T 1/0021 382/100 |
| 2008/0297623 A1* | 12/2008 | Cho | H04N 5/23293 348/231.99 |
| 2009/0319888 A1* | 12/2009 | Oygard | G06F 17/211 715/252 |
| 2010/0146436 A1* | 6/2010 | Jakobson | G01C 21/3682 715/800 |
| 2010/0211794 A1* | 8/2010 | Bilobrov | G06K 9/00067 713/176 |
| 2011/0271227 A1* | 11/2011 | Takahashi | G06F 3/0481 715/800 |
| 2012/0001914 A1* | 1/2012 | Pan | G06Q 30/0241 345/428 |
| 2012/0134595 A1* | 5/2012 | Fonseca | G06T 3/40 382/195 |
| 2013/0031471 A1* | 1/2013 | Xu | G06T 11/00 715/251 |
| 2013/0104076 A1* | 4/2013 | Cristescu | G06F 3/0485 715/800 |
| 2013/0111332 A1* | 5/2013 | Davis | G06F 3/0488 715/247 |
| 2013/0125039 A1* | 5/2013 | Murata | G06F 3/0484 715/781 |
| 2014/0006982 A1* | 1/2014 | Wabyick | G06F 17/212 715/763 |
| 2014/0086552 A1 | 3/2014 | Cheng | |
| 2014/0109043 A1* | 4/2014 | Bolotnikoff | G06F 17/30914 717/113 |
| 2014/0362078 A1* | 12/2014 | Yamada | G06T 15/00 345/419 |
| 2015/0084961 A1* | 3/2015 | Dai | G06T 3/4092 345/428 |
| 2015/0146011 A1* | 5/2015 | Tsubusaki | H04N 5/23296 348/169 |
| 2015/0156421 A1* | 6/2015 | Sokeila | H04N 5/23296 348/240.2 |
| 2015/0309570 A1* | 10/2015 | Lankford | G06F 3/013 715/863 |
| 2015/0309709 A1* | 10/2015 | Kulkarni | G06F 3/04845 715/781 |

FOREIGN PATENT DOCUMENTS

| | | |
|---|---|---|
| CN | 103581744 A | 2/2014 |
| EP | 2688295 A2 | 1/2014 |

\* cited by examiner

METHOD AND DEVICE FOR RENDERING MULTIMEDIA CONTENT

FIELD

Various embodiments of the disclosure relate to rendering multimedia content. More specifically, various embodiments of the disclosure relate to rendering multimedia content based on a region of interest (ROI) selected by a user.

BACKGROUND

Recent advancements in display technology have made it possible to render high resolution multimedia content on low resolution display screens of a display device (such as a smartphone, a personal digital assistant (PDAs), or a tablet computing device). In certain scenarios, a user may wish to perform zoom-in operation on the multimedia content, such as video, animation, and/or the like. In such scenarios, playback of the multimedia content has to be paused to perform the zoom-in operation on the multimedia content. In other scenarios, information related to the zoom-in operation may be preprocessed to render zoomed-in, pre-defined areas of selected frames of the multimedia content on the display screen of the display device. Thus, the user may not be able to dynamically perform the zoom-in operation on the multimedia content being rendered on the display screen of the display device.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a device are provided for rendering multimedia content substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Exemplary aspects of the disclosure may comprise a method for rendering multimedia content in a display device. The method may include determining a ratio between a first resolution of the multimedia content and a second resolution of a display screen of the first display device. The method may include receiving at least one user input to select a region of interest (ROI) on the multimedia content being rendered on the first display screen. Further, the method may include dynamically modifying the selected ROI on the multimedia content based on the determined ratio.

In an embodiment, the ratio may be greater than 1. In an embodiment, first resolution may be defined by a distinct number of pixels along a first width $P_{w1}$ and a distinct number of pixels along a first height $P_{h1}$ of the multimedia content. In an embodiment, the second resolution may be defined by a distinct number of pixels along a second width $P_{w2}$ and a distinct number of pixels along a second height $P_{h2}$ of the display screen.

In an embodiment, the ratio between the first resolution and the second resolution may correspond to a minimum of: a first ratio between $P_{w1}$ of the first resolution and $P_{w2}$ of the second resolution, or a second ratio between $P_{h1}$ of the first resolution and $P_{h2}$ of the second resolution.

In an embodiment, the method may include generating a zoom-in window around the selected ROI. The resolution of the zoom-in window may be determined based on the determined ratio and the second resolution. In another embodiment, the method may include rendering the zoom-in window on a first area of the display screen. The first area may be larger than an area of the generated zoom-in window.

In an embodiment, the method may include rendering the zoom-in window on the first area of the display screen of the display device. In another embodiment, the method may include rendering the zoom-in window on another display screen of another display device.

In an embodiment, the method may include determining the ratio between the first resolution of the multimedia content and a third resolution of the another display screen of the another display device. In an embodiment, the method may include rendering the multimedia content on the display screen without dynamically modifying the multimedia content.

In an embodiment, the method may include determining a number of zoom-in layers supported for the multimedia content. The number of zoom-in layers may be determined based on the determined ratio and a stepsize.

In an embodiment, the method may include rendering the multimedia content in one or more of the zoom-in layers in response to the at least one user input and at least one other user input subsequent to the at least one user input. In an embodiment, the at least one other user input may enable a selection of another ROI on the multimedia content being rendered on the one or more of the zoom-in layers.

In an embodiment, the method may include determining a current ratio for each of the one or more zoom-in layers. The current ratio may be determined based on the determined ratio and the stepsize. In an embodiment, the method may include generating another zoom-in window around another selected ROI. A resolution of the another zoom-in window may be determined based on the determined current ratio of a current zoom-in layer and the second resolution.

Figure 1:
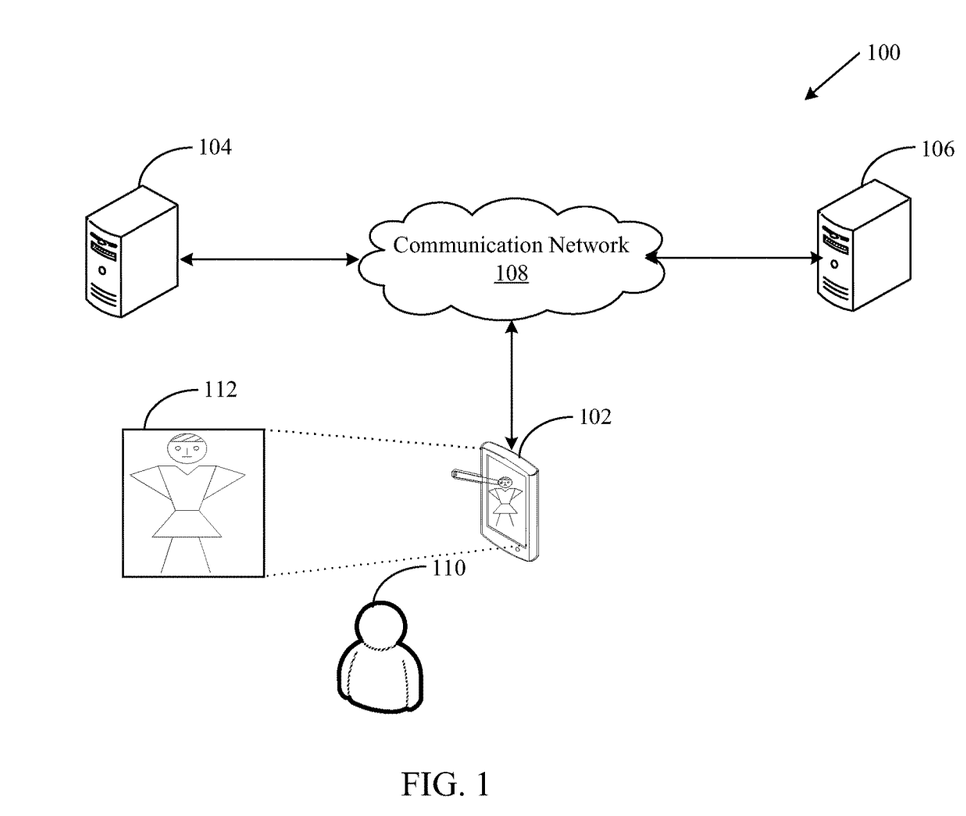
FIG. 1 is a block diagram illustrating a network environment for rendering multimedia content, in accordance with an embodiment of the disclosure.

FIG. 1 is a block diagram of a network environment, in accordance with an embodiment of the disclosure. With reference to FIG. 1, there is shown a network environment 100. The network environment 100 may comprise a display device 102, a content server 104, an online application server 106, a communication network 108, and a user 110. The display device 102 may include a display screen 112.

The display device 102 may be communicatively coupled with the content server 104, and the online application server 106, via the communication network 108. The display device 102 may be associated with the user 110.

The display device 102 may comprise suitable logic, circuitry, interfaces, and/or code that may be operable to receive multimedia content from at least one of the content server 104, the online application server 106, or a television broadcast station (not shown). The display device 102 may be operable to render the received multimedia content on the display screen 112. Examples of the display device 102 may include, but are not limited to, a smartphone, a touch screen device, a laptop, a tablet computer, a television, a video display, and/or a personal digital assistant (PDA) device. Although FIG. 1 shows only one display device (such as the display device 102) and only one user (such as the user 110) for simplicity, one skilled in the art may appreciate that the implementation of disclosed embodiments can occur for any number of display devices and users without limiting the scope of the disclosure.

The display screen 112 may comprise suitable logic, circuitry, interfaces, and/or code that may be operable to render the multimedia content, for the user 110. The display screen 112 may be further operable to display one or more features and/or applications of the display device 102, to the user 110. The display screen 112 may be further operable to receive an input from the user 110, via a touch-sensitive screen. The display screen 112 may be realized through several known technologies such as, but not limited to, Liquid Crystal Display (LCD) display, Light Emitting Diode (LED) display, Organic LED (OLED) display technology, and the like.

The content server 104 may comprise suitable logic, circuitry, interfaces, and/or code that may be operable to provide multimedia content to the display device 102 and the online application server 106. The multimedia content may correspond to a continuous sequence of audio, video, text, image, animation, and/or a combination thereof. Examples of the multimedia content may include, but are not limited to, a live news bulletin, a live sports event, on-demand internet streaming media content, and/or the like. The content server 104 may be configured to include one or more storage devices to maintain a repository of the multimedia content. In an embodiment, the one or more storage devices may be connected to each other based on a distributed network. Examples of the content server 104 may include, but are not limited to, television network providers, on-demand content providers, independent content provider organizations, web servers, e-mail service providers, and/or social media service providers. The content server 104 may be further operable to facilitate live broadcasts, for example, news bulletins, sports events, live entertainment shows, and/or the like, for the display device 102. The content server 104 may transmit the multimedia content to the display device 102 and/or the online application server 106, via the communication network 108.

The online application server 106 may comprise suitable logic, circuitry, interfaces, and/or code that may be operable to host web-based applications for the display device 102. Examples of the web-based applications may include, but are not limited to, webmail, online retail sales, online auctions, wikis, audio-visual conferences, multi-player games, live video sessions, live chat sessions and/or the like. Such web-based applications may be reliant on a common web browser to execute the online application hosted by the online application server 106. The online application server 106 may be implemented as a cluster of a plurality of computing devices, configured to perform as the online application server 106. The online application server 106 may optionally include a storage medium to store the multimedia content. In an embodiment, the online application server 106 may be combined with the content server 104. In such an embodiment, the online application server 106 may be operable to manage operations of both the content server 104 and the online application server 106. Further, in such an embodiment, the online application server 106 may store content associated with both the content server 104 and the online application server 106.

The communication network 108 may include a medium through which the display device 102 may communicate with the content server 104, the online application server 106, and/or a television broadcast station. Examples of the communication network 108 may include, but are not limited to, the Internet, a Wireless Fidelity (WiFi) network, a Wireless Local Area Network (WLAN), a Local Area Network (LAN), a telephone line (POTS), and/or a Metropolitan Area Network (MAN). Various devices in the network environment 100 may be operable to connect to the communication network 108, in accordance with various wired and wireless communication protocols, such as Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

In operation, the display device 102 may be operable to receive the multimedia content from at least one of the content server 104, the online application server 106, or the television broadcast station (not shown). The display device may render the received multimedia content on the display screen 112. In an embodiment, a first resolution of the multimedia content may be higher than a second resolution of the display screen 112. In such an embodiment, the display device 102 may reduce the first resolution of the multimedia content, based on the second screen resolution of the display screen 112. The display device 102 may be operable to render the multimedia content with the reduced resolution on the display screen 112.

In an embodiment, the first resolution of the multimedia content may be reduced at one of the content server 104, the online application server 106, or the television broadcast station (not shown). In such an embodiment, the display device 102 may receive the reduced resolution of the multimedia content, such that the reduced resolution matches the second screen resolution of the display screen 112.

In an embodiment, the first resolution may be represented as a number of distinct pixels along the first width ($P_{w1}$) and a number of distinct pixels along the first height ($P_{h1}$) of the multimedia content. The second resolution may be represented as a number of distinct pixels along the second width ($P_{w2}$) and a number of distinct pixels along the second height ($P_{h2}$) of the display screen 112.

In an embodiment, the display device 102 may be operable to determine a ratio between the first resolution of the received multimedia content and the second resolution of the display screen 112. The display device 102 may be also operable to receive an input signal from the user 110. The input signal may correspond to a selection of a first region of interest (ROI) on the multimedia content, rendered on the display screen 112. In an embodiment, the display device 102 may determine the ratio in response to the input signal received from the user 110.

In an embodiment, the display device 102 may determine a first ratio between $P_{w1}$ of the multimedia content and $P_{w2}$ of the display screen 112. The display device 102 may determine a second ratio between $P_{h1}$ of the multimedia content and $P_{h2}$ of the display screen 112. In an embodiment, the display device 102 may determine the minimum of the first ratio and the second ratio, as the ratio between the first resolution and the second resolution.

Based on the determined ratio, the display device 102 may be operable to dynamically modify the selected ROI on the multimedia content, rendered on the display screen 112. When the ratio is determined to be greater than one, the display device 102 may be operable to perform a zoom-in operation on the multimedia content. Such a zoom-in operation may be performed on a pre-defined area around the selected first ROI, based on the determined ratio.

In an embodiment, the display device 102 may generate a first zoom-in window around the selected first ROI, based on the determined ratio. The first zoom-in window may include the pre-defined area around the selected first ROI in the multimedia content. In an embodiment, the display device 102 may generate the first zoom-in window around the first ROI, such that the first ROI is the center of the first zoom-in window. In an embodiment, the display device 102 may perform the zoom-in operation on the pre-defined area around the selected first ROI in the first zoom-in window. To perform the zoom-in operation, the display device 102 may render the first zoom-in window on a larger area of the display screen 112, as compared to the area occupied when the multimedia content is rendered normally, on the display screen 112. In an embodiment, the display device 102 may render the first zoom-in window on the entire display screen 112 to perform the zoom-in operation.

In an embodiment, the display device 102 may generate a plurality of zoom-in windows, in response to a selection of the ROI on a current zoom-in window. The display device 102 may generate the plurality of zoom-in windows until the resolution of a zoom-in window is greater than or equal to the second resolution of the display screen 112.

In an embodiment, the display device 102 may perform a zoom-out operation to render the entire multimedia content on the display screen 112. In another embodiment, the display device 102 may progressively perform the zoom-out operation through the plurality of zoom-in windows, to render the entire multimedia content.

In an embodiment, the display device 102 may perform the zoom-in operation or the zoom-out operation, through one of the plurality of zoom-in windows of the multimedia content.

In an embodiment, the display device 102 may render a current zoom-in window of the plurality of zoom-in windows of the multimedia content, on a remote display device (not shown).

Figure 2:
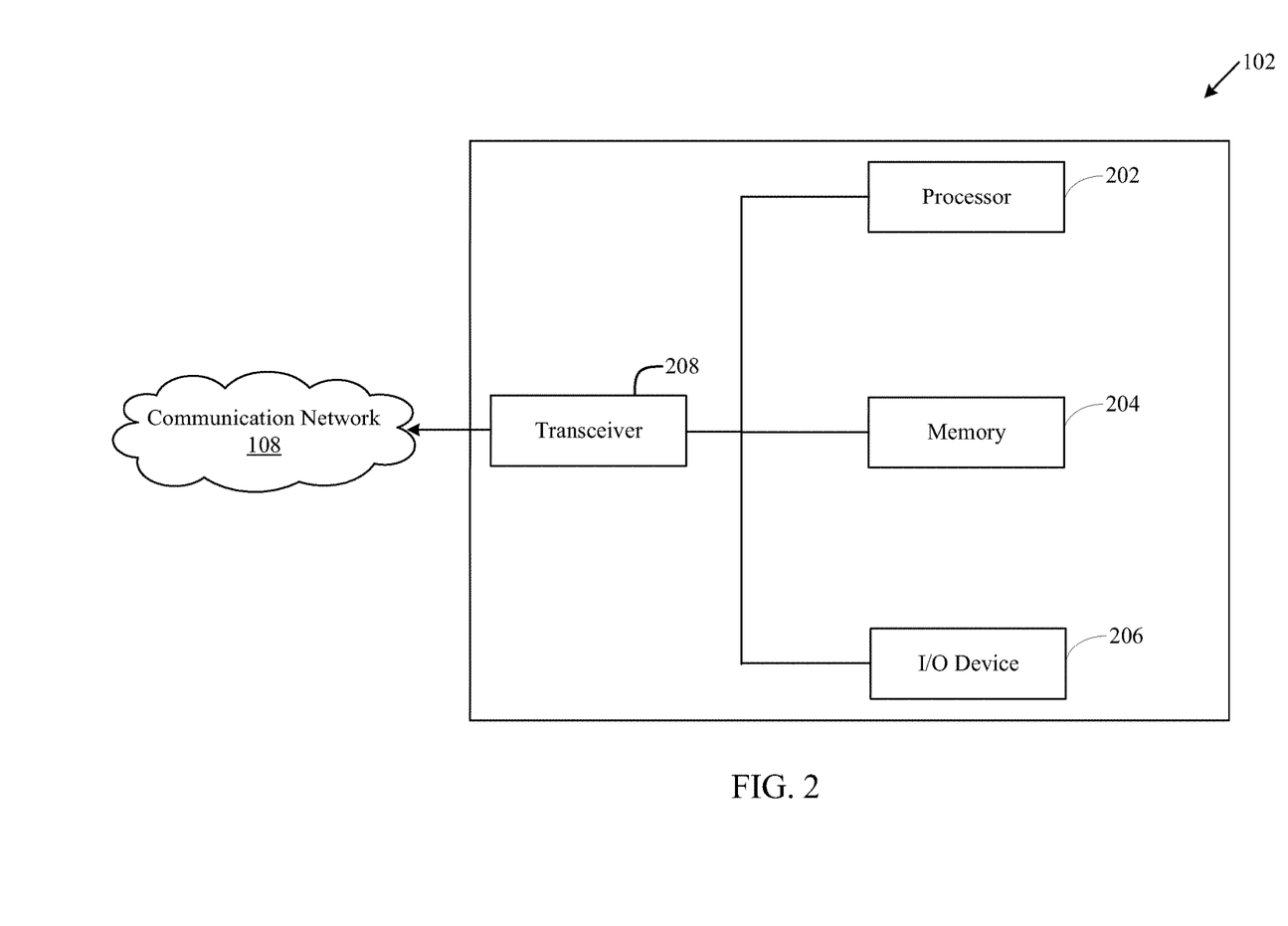
FIG. 2 is a block diagram illustrating an exemplary display device, in accordance with an embodiment of the disclosure.

FIG. 2 is a block diagram illustrating a display device, in accordance with an embodiment of the disclosure. FIG. 2 is explained in conjunction with elements from FIG. 1. With reference to FIG. 2, there is shown a display device 102. The display device 102 may comprise one or more processors, such as a processor 202, a memory 204, one or more Input-Output (I/O) devices, such as an I/O device 206, and a transceiver 208.

The processor 202 may be communicatively coupled to the memory 204, and the transceiver 208. Further, the processor 202 may be further communicatively coupled to the I/O device 206.

The processor 202 may comprise suitable logic, circuitry, interfaces, and/or code that may be operable to execute a set of instructions stored in the memory 204. The processor 202 may be implemented based on a number of processor technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or any other processor.

The memory 204 may comprise suitable logic, circuitry, interfaces, and/or code that may be operable to store the received set of instructions. The memory 204 may be operable to store a multimedia data-store. The multimedia data-store may be operable to store a plurality of multimedia content that the processor 202 may render on the display screen 112. Such a multimedia data-store may be communicatively coupled with a secondary storage device, such as a hard disk or external storage device, such as a compact disc (CD). Such a communicative coupling may enable the multimedia data-store to buffer multimedia content retrieved from the secondary storage device or the external storage device. The multimedia data-store may be implemented by the use of various multimedia database management systems that are well known to those skilled in the art. The memory 204 may be implemented based on, but not limited to, a Random Access Memory (RAM), a Read-Only Memory (ROM), a Hard Disk Drive (HDD), a storage server and/or a Secure Digital (SD) card.

The transceiver 208 may comprise suitable logic, circuitry, interfaces, and/or code that may be operable to communicate with the content server 104, the online application server 106, and/or the television broadcast station (not shown), via various communication interfaces. The transceiver 208 may implement known technologies for supporting wired or wireless communication with the communication network 108. The transceiver 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a memory. The transceiver 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies including, but not limited to, Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The I/O device 206 may comprise various input and output devices that may be operable to connect to the processor 202. Examples of the input devices may include, but are not limited to, a keyboard, a mouse, a joystick, a touch screen, a microphone, a camera, a motion sensor, a light sensor, and/or a docking station. Examples of the output devices may include, but are not limited to, the display screen 112, and/or a speaker.

In operation, the processor 202 may be operable to render multimedia content on the display screen 112. The processor 202 may receive an input signal, provided by the user 110. The input signal may be provided by the user 110, through the I/O device 206. The input signal may comprise a selection of a first ROI on the multimedia content, rendered on the display screen 112. In an embodiment, the user 110 may provide the input signal based on a touch-based input on the display screen 112, using a pointing device such as a mouse, and/or the like.

In response to the input signal, the processor 202 may determine a ratio (R) between the first resolution of the multimedia content and the second resolution of the display screen 112. In an embodiment, the processor 202 may determine the ratio R between the first resolution and the second resolution, independent of the input signal. The processor 202 may be operable to store the determined ratio in the memory 204.

In an embodiment, the processor 202 may determine the first resolution of the multimedia content, based on one or more display properties, associated with the multimedia content. In an embodiment, the one or more display properties may be received from the source of the multimedia content. In an embodiment, the one or more display properties may be retrieved from the memory 204.

In an embodiment, the processor 202 may determine the second resolution of the display screen 112, based on the display device specification information of the display device 102. The display device specification information may be retrieved from the memory 204.

In an embodiment, the processor 202 may determine the minimum of the first ratio $r_1$, and the second ratio $r_2$, as the ratio between the first resolution and the second resolution. For example, the first resolution of the multimedia content is 4096 pixels by 2048 pixels (4096×2048 pixels) and the second resolution of the display screen 112 is 720 pixels by 480 pixels (720×480 pixels). In accordance with the exemplary scenario, the processor 202 determines $r_1$ as 5.68, and $r_2$ as 4.26. As the minimum of $r_1$ and $r_2$ is $r_2$, the processor 202 determines $r_2$ (4.26) as the ratio R between the first resolution and the second resolution.

In an embodiment, the processor 202 may determine the ratio as an integer value. In such an embodiment, the processor 202 may truncate the fractional part of the determined value of the ratio. In accordance with the exemplary scenario above, the processor 202 may determine the ratio R between the first resolution and the second resolution to be 4.

In an embodiment, when the processor 202 determines that the ratio R between the first resolution and the second resolution is less than or equal to one, the processor 202 may not perform the zoom-in operation on the multimedia content. The processor 202 may notify the user 110 that the zoom-in functionality is not enabled for the multimedia content. The processor 202 may render a notification, such as a text message, on the display screen 112, to notify the user 110.

In an embodiment, when the processor 202 determines that the ratio R is greater than one, the processor 202 may be operable to perform a zoom-in operation on the multimedia content. In such an embodiment, the processor 202 may determine a stepsize S, stored in the memory 204. In an embodiment, the user 110 may provide the stepsize S to the processor 202, via an I/O device 206 (such as a keyboard). In an embodiment, the user 110 may change the value of the stepsize S and re-configure the display device 102. In an embodiment, the processor 202 may dynamically determine the stepsize based on the determined ratio R. Based on the determined ratio R and the stepsize S, the processor 202 may determine a number of zoom-in layers that may be supported by the display device 102 for the multimedia content.

In an embodiment, when an original resolution of the multimedia content is higher than the resolution of the display screen 112, the original resolution of the multimedia content is reduced to match the resolution of the display screen 112. In such an embodiment, the zoom-in operation may be performed to magnify a pre-defined area, which corresponds to the ROI selected on the multimedia content. To magnify the pre-defined area, the resolution of the pre-defined area may be increased up to the original resolution, without degrading the display quality of the pre-defined area of the multimedia content.

The processor 202 may determine a value of a current ratio for each zoom-in layer. The value of the current ratio for a first zoom-in layer (R1) is the value of the determined ratio R. The processor 202 may determine the current value of the ratio for successive zoom-in layers based on the stepsize S. The value of the current ratio for each of the successive zoom-in layers is less than the value of the current ratio for the previous zoom-in layer by a factor of the stepsize S. For example, the value of the current ratio for the second zoom-in layer (R2) is the stepsize S less than the value of the current ratio of the first zoom-in layer R1. Similarly, the value of the current ratio for the third zoom-in layer (R3) is the stepsize S less than the value of the current ratio of the second zoom-in layer R2.

In an embodiment, the processor 202 may be operable to change the stepsize S after a pre-specified or arbitrary number of zoom-in layers. For example, the user 110 may initially provide a stepsize S of 1 for three zoom-in layers. After the second zoom-in layer, the user 110 may wish to change the stepsize to a value of 0.5 for a last zoom-in layer.

The processor 202 may determine the number of zoom-in layers up to which the value of the current ratio is determined to be greater than or equal to one as the number of zoom-in layers, supported for the multimedia content. In an embodiment, the processor 202 may determine additional number of zoom-in layers for the multimedia content when pixel density of the display screen 112 is greater than a predetermined threshold value. Notwithstanding, the disclosure may not be so limited and the pixel density may be measured as pixels per inch (PPI) or pixels per centimeter (PPCM) without limiting the scope of the disclosure.

In an embodiment, the value of the stepsize S may be an integer value. In an embodiment, the value of the stepsize S may be a fractional value. It may be appreciated by a person ordinarily skilled in the art, that lesser is the value of the stepsize, greater is the number of zoom-in layers supported by the display device 102.

The processor 202 may generate a zoom-in window for each zoom-in layer. When the user 110 selects the first ROI on the multimedia content rendered on the display screen 112, the processor 202 may generate a first zoom-in window for a first pre-defined area around the selected ROI. The first zoom-in window may include the first pre-defined area of the multimedia content around the selected first ROI. In an embodiment, the processor 202 may generate the first zoom-in window around the first ROI, such that the first ROI is the center of the first zoom-in window.

The processor 202 may determine a resolution of the first zoom-in window. The processor 202 may determine the resolution of the first zoom-in window, based on the current ratio of the first zoom-in layer R1, and the second resolution of the display screen 112. The processor 202 may determine the current ratio of the first zoom-in layer R1, to be ratio R. The processor 202 may determine the resolution of the first zoom-in window as the second resolution of the display screen 112 ($S_x \times S_y$ pixels) multiplied by the current ratio of the first zoom-in layer R1. Thus, the resolution of the first zoom-in window is (($S_x$*R1)×($S_y$*R1) pixels).

The processor 202 may perform the zoom-in operation on the first pre-defined area around the selected first ROI. To perform the zoom-in operation, the processor 202 may render the first zoom-in window on the display screen. In an embodiment, the first zoom-in window may be rendered on a larger area of the display screen 112, as compared to the area occupied when the multimedia content is rendered normally, on the display screen 112. In an embodiment, the processor 202 may reduce the resolution of the first zoom-in window to fit in the second resolution of the display screen 112. In an embodiment, the first zoom-in window may occupy the entire display screen 112. In such an embodiment, the processor 202 may render the first zoom-in window on the entire display screen 112.

In an embodiment, the user 110 may further select a second ROI in the first zoom-in window rendered on the display screen 112. In such an embodiment, the processor 202 may generate a second zoom-in window in a second pre-determined area around the selected second ROI. The second zoom-in window may include the second pre-defined area of the multimedia content around the selected ROI. The processor 202 may determine a resolution of the second zoom-in window, based on the current ratio of the second zoom-in layer R2, and the second resolution of the display screen 112. The current ratio of the second zoom-in layer R2 may be determined based on a difference between the current ratio of the first zoom-in layer R1, and the step size S. The processor 202 may determine the resolution of the second zoom-in window as the second resolution of the display screen 112 ($S_x \times S_y$ pixels) multiplied by the current ratio of the second zoom-in layer (R2). Thus, resolution of the second zoom-in window of the multimedia content in the second zoom-in window is determined as (($S_x$*R2)×($S_y$*R2) pixels).

The processor 202 may perform the zoom-in operation on the second pre-defined area around the selected second ROI. To perform the zoom-in operation, the processor 202 may render the second zoom-in window on a larger area of the display screen 112 than during rendering of the first zoom-in window. In an embodiment, the processor 202 may reduce the resolution of the second zoom-in window to fit in the second resolution of the display screen 112. In an embodiment, the second zoom-in window may occupy the entire display screen 112. In such an embodiment, the processor 202 may render the second zoom-in window on the entire display screen 112.

Similarly, the processor 202 may further generate successive zoom-in windows, in response to a selection of successive ROIs on the successive zoom-in windows. The processor 202 may generate the successive zoom-in windows in response to the successive selection of successive ROIs until the current ratio of the zoom-in layer is greater than 1. In instances where the current ratio of a zoom-in layer becomes less than 1, the processor 202 may not further support the zoom-in operation on the multimedia content.

In an embodiment, a zoom-in window may be generated to display a zoomed-in area, which may correspond to an ROI of the multimedia content rendered on the display screen 112. In an embodiment, the zoom-in window may facilitate the user 110 to view a larger size of the selected ROIs of the multimedia content that may be too small to view the details of the multimedia content on the display screen 112. Additionally, the zoomed-in, pre-defined areas of the multimedia content may be viewed on the display screen 112 without degradation in display quality of the multimedia content.

In an embodiment, the multimedia content may be rendered on a first area of the display screen 112. Additional information, such as subtitles, control menu, and the like, associated with the multimedia content may be rendered on a second area of the display screen. In such an embodiment, the processor 202 may be operable to determine a resolution of the first area of the display screen 112, as the second resolution of the display screen 112.

In an embodiment, the processor 202 may be operable to render a navigation icon on the display screen 112. In such an embodiment, the navigation icon may display the number of zoom-in layers and the current zoom-in layer of the multimedia content.

In an embodiment, the processor 202 may be operable to render a zoom-out icon on the display screen 112. In such an embodiment, the user 110 may zoom-out from a current zoom-in layer to the normal playback of the multimedia content. In an embodiment, the processor 202 may be operable to directly zoom-out to the normal playback of the multimedia content. In an embodiment, the processor 202 may be operable to progressively zoom-out through each of the successive zoom-in layers, to the normal playback of the multimedia content.

In an embodiment, the processor 202 may be operable to determine an orientation of the display device 102. In such an embodiment, the display device 102 may comprise a sensor, such as a gyroscopic sensor, to determine the orientation of the display device 102. The processor 202 may be operable to render the multimedia content on the display screen 112, based on the determined change in orientation of the display device 102. The processor 202 may be further operable to determine the second resolution of the display screen 112, based on the change in orientation of the display device 102. Further, the processor 202 may be operable to zoom-in the multimedia content based on the determined change in orientation of the display device 102.

In an embodiment, the processor 202 may be operable to render the generated zoom-in window around the selected ROI, as a picture-in-picture window on the display screen 112. In such an embodiment, one portion of the display screen 112 may render normal playback of the multimedia content, and another portion on the display screen 112 may render playback of the multimedia content, which corresponds to the zoom-in window. In an embodiment, the processor 202 may be operable to render the generated zoom-in window around the selected ROI, on the entire display screen 112. In an embodiment, the processor 202 may be operable to render the generated zoom-in window around the selected ROI, on a remote display screen.

The user 110 may provide a touch-based input, such as a finger swipe, to render the generated zoom-in window on the display screen 112. In an embodiment, the user 110 may swipe a finger inwards, to render the multimedia content which corresponds to the generated zoom-in window on the display screen 112. In an embodiment, the user may swipe a finger outwards, to render the generated zoom-in window on a remote display screen. In an embodiment, the processor 202 may be operable to render the generated zoom-in window on the remote display screen, and render the normal playback of the multimedia content on the display screen 112. In an embodiment, the processor 202 may be operable to determine a third resolution of the display screen of the remote display device. Further, the processor 202 may be operable to determine the ratio R between the first resolution and the third resolution. In an embodiment, the processor 202 may be operable to amplify sound, associated with the zoomed-in ROI of the multimedia content.

In an embodiment, the online application server 106 may be operable to render the multimedia content on the display device 102. In such an embodiment, the online application server 106 may comprise one or more processors operable to determine the ratio between the first resolution of the multimedia content and the second resolution of the display screen 112 of the display device 102. The one or more processors of the online application server 106 may receive an input signal from the user 110 to select an ROI on the multimedia content. Further, the one or more processors of the online application server 106 may perform zoom-in operation on the multimedia content corresponding to the selected ROI. The online application server 106 may be operable to perform functionalities similar to that of the processor 202 of the display device 102.

FIGS. 3A, 3B, 3C, and 3D illustrate a first exemplary scenario for implementing the disclosed method and device for rendering multimedia content, in accordance with an embodiment of the disclosure. FIGS. 3A to 3D are explained in conjunction with elements from FIG. 1, and FIG. 2. With reference to FIGS. 3A to 3D, there is shown an exemplary scenario 300 to perform zoom-in operation on multimedia content 302. FIGS. 3A to 3D include the display device 102, and the display screen 112.

The display device 102, such as a video display device, may be operable to render multimedia content 302, such as video content. The display device 102 may retrieve the multimedia content 302 from one of the memory 204, the content server 104, the online application server 106, or the television broadcast station. For the following description of FIGS. 3A to 3D, the first resolution of the multimedia content 302 is assumed to be 3072×1728 pixels, and the second resolution of the display screen 112 is assumed to be 720×480 pixels. Notwithstanding, the disclosure may not be so limited and the first resolution and the second resolution may assume various values without limiting the scope of the disclosure.

The first resolution of the multimedia content 302 is greater than the second resolution of the display screen 112. The display device 102 may reduce the first resolution of the multimedia content 302 to fit the multimedia content 302 onto the display screen 112.

The display device 102 may determine the first resolution of the multimedia content 302, based on one or more display properties associated with the multimedia content 302. The one or more display properties may be received from the source of the multimedia content 302 or may be retrieved from the memory 204.

The display device 102 may determine the second resolution of the display screen 112, based on the display device specification information of the display device 102. The display device specification information may be retrieved from the memory 204.

Figure 3A:
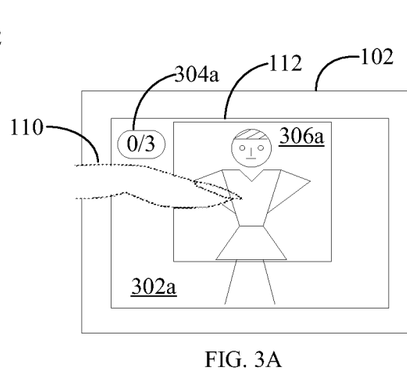
FIGS. 3A, 3B, 3C, and 3D illustrate a first exemplary scenario for implementing the disclosed display method and device, in accordance with an embodiment of the disclosure.

As shown in FIG. 3A, the first resolution of the multimedia content 302 may be reduced to render the multimedia content 302 on the display screen 112, as a first multimedia content 302a. The user 110 may select a first ROI on the first multimedia content 302a rendered on the display screen 112. To select the first ROI, the user 110 may provide a touch-based user input, via the display screen 112, at a position that corresponds to the first ROI.

In response to the user input, the display device 102 may determine the ratio R between the first resolution and the second resolution. The display device 102 may determine the ratio R, as the minimum of the first ratio and the second ratio. In accordance with an embodiment, the display device 102 may determine the first ratio to be 4.26 and the second ratio to be 3.6. The display device 102 determines the minimum of the two, the ratio R, which is 3.6. The display device 102 may determine the ratio R as an integer value, based on a truncation of the fractional part of the determined ratio R to determine the ratio R as 3.

The display device 102 may further determine the stepsize. For the following description of FIGS. 3A to 3D, the stepsize is assumed to be 1. Further, the display device 102 may determine the current ratio for each zoom-in layer of the multimedia content 302.

In accordance with another embodiment, the value of the current ratio for a first zoom-in layer is the value of the determined ratio R. Thus, value of the current ratio for the first zoom-in layer is 3. For a second zoom-in layer, the value of the current ratio may be determined as the difference between the current ratio of the first zoom-in layer and the stepsize S. Thus, the value of the current ratio for the second zoom-in layer is 2. Similarly, the value of the current ratio for a third zoom-in layer is 1. Further, the value of the current ratio for a fourth zoom-in layer is 0. Since the value of the current ratio for the fourth zoom-in layer is less than one, the display device 102 may determine the number of zoom-in layers supported for the multimedia content 302 to be 3.

A navigation icon 304 may be displayed on the display screen. The navigation icon 304 displays a current zoom-in layer and the number of zoom-in layers supported for the multimedia content 302.

With reference to FIG. 3A, the user 110 may select a first ROI on the first multimedia content 302a, rendered on the display screen 112. In response to the selection of the first ROI, a first zoom-in window 306a, which includes a first pre-defined area around the first ROI of the first multimedia content 302a, may be generated. Resolution of the first zoom-in window 306a is determined to be ((720*3)× (480*3) pixels) (referred to as 2160×1440 pixels). The display device 102 may reduce the determined resolution of the first zoom-in window 306a, to fit onto the second resolution of the display screen 112.

Figure 3B:
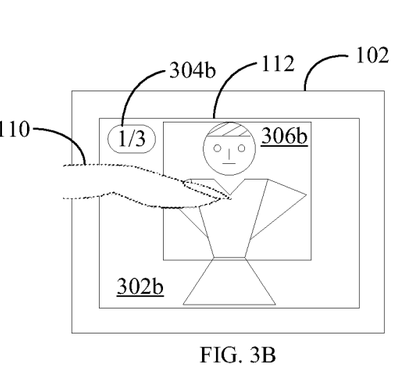

With reference to FIG. 3B, a second multimedia content 302b rendered on the display screen 112, may correspond to the first pre-defined area of the multimedia content 302 in the first zoom-in window 306a. As shown in FIG. 3B, the first pre-defined area of the multimedia content 302 is zoomed-in and rendered as the second multimedia content 302b. In FIG. 3B, the navigation icon 304 may show status of the current zoom-in layer as "⅓".

Further, as shown in FIG. 3B, the user 110 may select a second ROI on the second multimedia content 302b, rendered on the display screen 112. In response to the selection of the second ROI, a second zoom-in window 306b, which includes a second pre-defined area around the second ROI of the second multimedia content 302b, may be generated. Resolution of the second zoom-in window 306b, is determined to be ((720*2)×(480*2) pixels) (referred to as 1440× 960 pixels). The display device 102 may reduce the determined resolution of the second zoom-in window 306b, to fit onto the second resolution of the display screen 112.

Figure 3C:
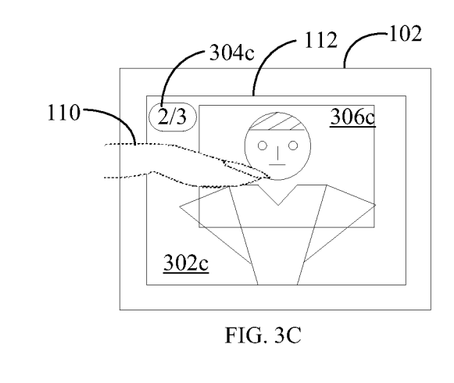

With reference to FIG. 3C, a third multimedia content 302c displayed on the display screen 112, may correspond to the second pre-defined area of the second multimedia content 302b, in the second zoom-in window 306b. As shown in FIG. 3C, the second pre-defined area of the multimedia content 302 may be zoomed-in and rendered as the third multimedia content 302c. In FIG. 3C, the navigation icon 304 may show status of the current zoom-in layer as "⅔".

Further, as shown in FIG. 3C, the user 110 may select a third ROI on the third multimedia content 302c, rendered on the display screen 112. In response to the selection of the third ROI, a third zoom-in window 306c, which includes a third pre-defined area of the third multimedia content 302c, may be generated. Resolution of the third zoom-in window 306c, is determined to be ((720*1)×(480*1)) pixels (referred to as 720×480 pixels). The resolution of the third zoom-in window 306c is equal to resolution of display screen 112. Thus, the third zoom-in window 306c may be rendered on the display screen 112 without reduction of the resolution of the third zoom-in window.

Figure 3D:
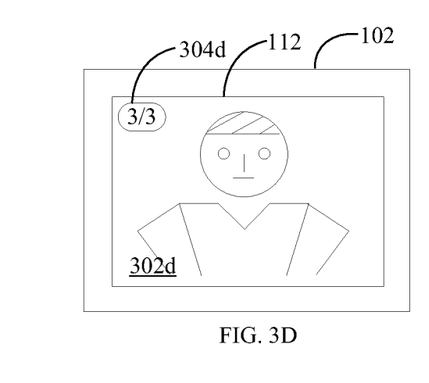

With reference to FIG. 3D, a fourth multimedia content 302d displayed on the display screen 112, may correspond to the third pre-defined area of the third multimedia content 302c in the third zoom-in window 306c. As shown in FIG. 3C, the third pre-defined area of the third multimedia content 302c may be zoomed-in and displayed as the fourth multimedia content 302d. In FIG. 3D, the navigation icon 304 may show status of the current zoom-in layer as "3/3".

For the fourth zoom-in layer, the current ratio is less than 1. Thus, further zoom-in layers beyond the third zoom-in layer are not supported for the multimedia content 302. When the user 110 further selects a region of interest on the fourth multimedia content 302d, the display device 102 may notify the user that the further zoom-in layers are not supported for the multimedia content 302. Zoom-in operation for a pre-defined area which corresponds to the selected ROI on the fourth multimedia content 302d, cannot be performed.

Figure 4:
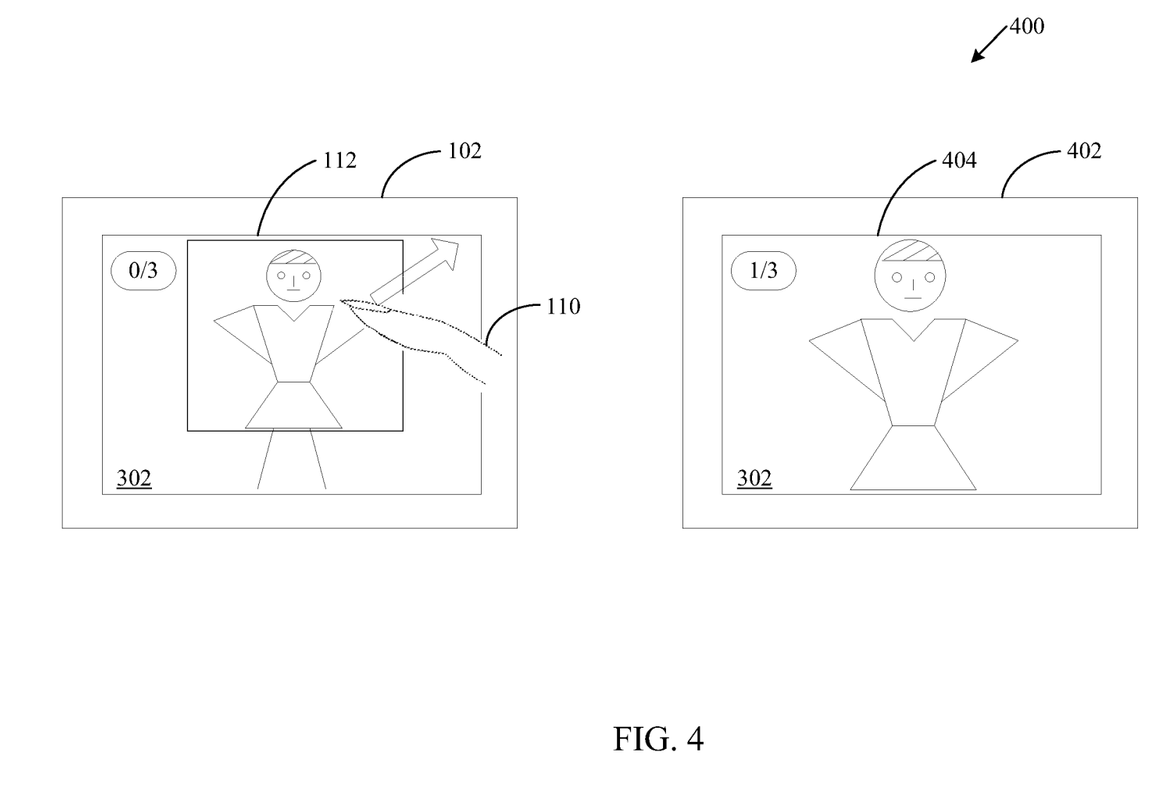
FIG. 4 illustrates a second exemplary scenario for implementing the disclosed display method and device, in accordance with an embodiment of the disclosure.

FIG. 4 illustrates a second exemplary scenario for implementing the disclosed method and device for rendering multimedia content, in accordance with an embodiment of the disclosure. FIG. 4 is explained in conjunction with elements from FIG. 1, and FIG. 2. With reference to FIG. 4, there is shown the multimedia content 302, the display device 102, the display screen 112, and a remote display device 402. The remote display device 402 may include a remote display screen 404.

As shown in FIG. 4, the multimedia content 302 may be displayed on the display screen 112 of the display device 102. The user 110 may select an ROI on the multimedia content, rendered on the display screen 112. The user 110 may select the ROI based on a touch-based input, such as a finger tap on the display screen 112.

The user 110 may further provide an input signal to render a zoom-in window associated with the selected ROI on a remote display screen 404, of the remote display device 402. For example, the user 110 may swipe a finger outwards on the display screen 112, to render the zoom-in window on the remote display screen 404. The zoom-in window may be generated based on a pre-defined area around the selected ROI. Thus, the selected ROI on the multimedia content is zoomed-in and rendered on the remote display screen 404, while the original multimedia content is rendered on the display screen 112 of the display device 102.

Figure 5:
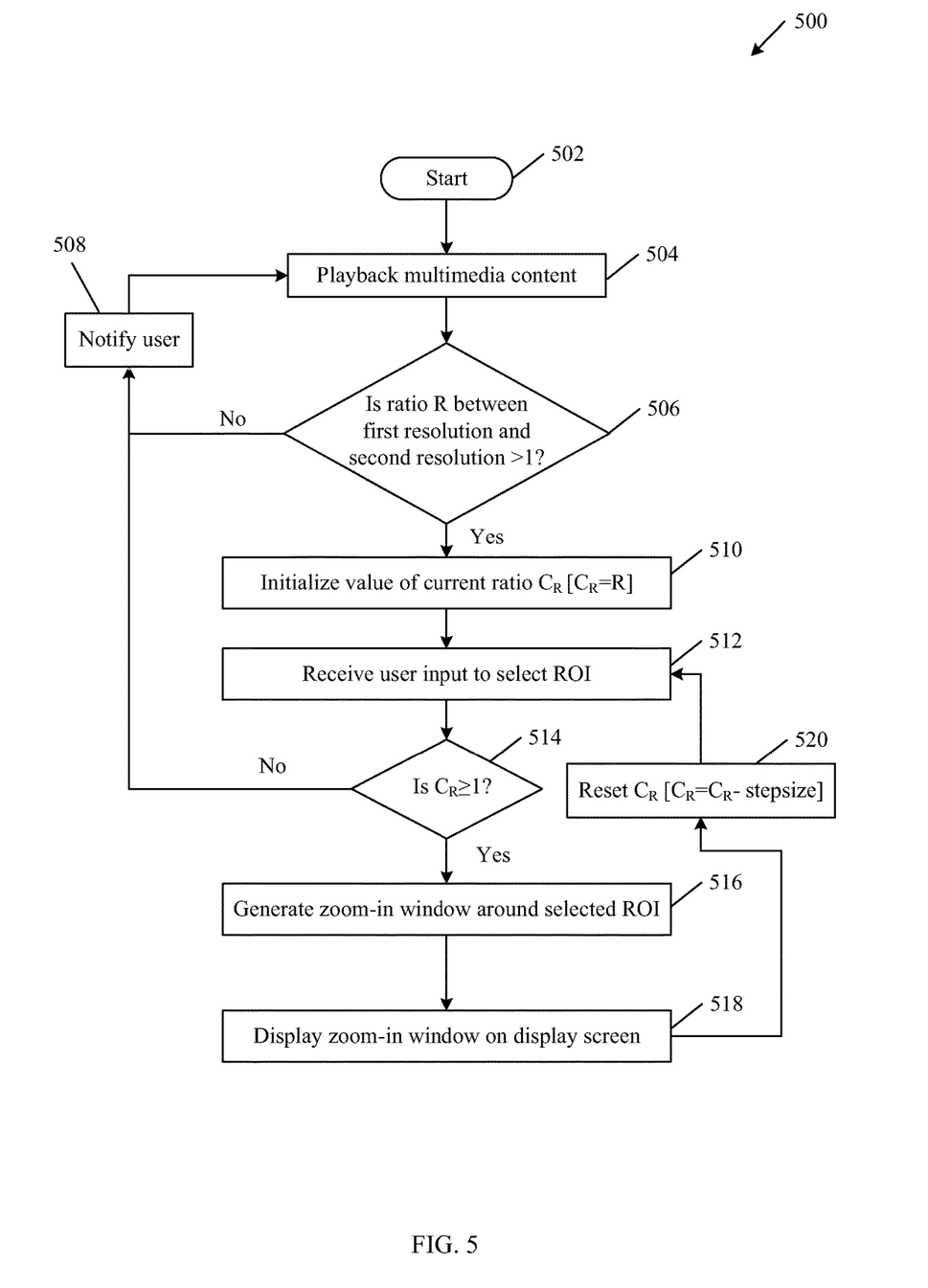
FIG. 5 is a flow chart illustrating a method for rendering multimedia content, in accordance with an embodiment of the disclosure.

FIG. 5 is a flowchart illustrating a method for rendering multimedia content, in accordance with an embodiment of the disclosure. FIG. 5 is described in conjunction with elements of FIG. 1, and FIG. 2. The method 500 may be implemented in the display device 102, communicatively coupled to the content server 104, and/or the online application server 106.

The method 500 begins at step 502 and proceeds to step 504. At step 504, the multimedia content may be rendered on the display screen 112.

At step 506, a ratio R between a first resolution of the multimedia content and a second resolution of the display screen 112 may be determined. In instances where the determined ratio R is less than or equal to 1, the method proceeds to step 508.

At step 508, when the determined ratio R is less than or equal to 1, the user 110 may be notified that zoom-in operation may not be performed on the multimedia content. The control then returns to step 504.

In instances where the determined ratio R is greater than 1, the method proceeds to step 510. At step 510, when the determined ratio R is greater than 1, a value of a current ratio ($C_R$) may be initialized with the value of the ratio R.

At step 512, an input signal may be received from the user 110. The input signal may be received to select a region of interest (ROI) on the multimedia content, rendered on the display screen 112.

At step 514, in response to the received input signal, the value of $C_R$ for a current zoom-in layer of the multimedia content may be checked. In instances where the value of $C_R$ for the current zoom-in layer is less than 1, the method returns to step 508.

In instances where the value of $C_R$ for the current zoom-in layer is greater than or equal to 1, the method proceeds to step 516. At step 516, a zoom-in window around the selected ROI on the multimedia content, rendered on the display screen 112 may be generated.

At step 518, the zoom-in operation on the multimedia content may be performed. The generated zoom-in window may be rendered on the entire display screen 112. At step 520, the value of $C_R$ may be reset based on an expression, [$C_R = C_R - \text{stepsize}$]. The control then returns to step 512.

In accordance with another embodiment of the disclosure, the display device 102 (FIG. 2) for rendering multimedia content is presented. Exemplary aspects of the disclosure may comprise one or more processors, such as the processor 202 (FIG. 2), in the display device 102. The processor 202 may be operable to determine a ratio between a first resolution of the multimedia content and a second resolution of the display screen 112 (FIG. 1) of the display device 102. The processor 202 may further be operable to receive at least one user input. The at least one user input may select a region of interest (ROI) on the multimedia content being rendered on the display screen 112. The processor 202 may be operable to dynamically modify the selected ROI based on the determined ratio. In an embodiment, the first resolution of the multimedia content is greater than the second resolution of the display screen 112.

In accordance with another embodiment of the disclosure, the online application server 106 (FIG. 1) for rendering multimedia content on the display device 102 (FIG. 2) is presented. Exemplary aspects of the disclosure may comprise one or more processors, in the display device 102. The one or more processors may be operable to determine a ratio between a first resolution of the multimedia content and a second resolution of the display screen 112 (FIG. 1) of the display device 102. The one or more processors may further be operable to receive at least one user input. The at least one user input may select a region of interest (ROI) on the multimedia content being rendered on the display screen 112. The one or more processors may be operable to dynamically modify the selected ROI on the multimedia content based on the determined ratio.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for rendering multimedia content. The at least one code section in an electronic device may cause the machine and/or computer to perform the steps comprising determining a ratio between a first resolution of the multimedia content and the second resolution of a display screen rendering the multimedia content. The steps further comprise selecting an ROI of the multimedia content in response to a user signal, and dynamically modifying the selected ROI on the multimedia content based on the determined ratio.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a pre-defined area of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
in a first display device that includes a first display screen:
determining a first ratio of a first resolution of multimedia content to a second resolution of said first display screen;
receiving a first user input to select a first region of interest (ROI) on said multimedia content, wherein said multimedia content is rendered on said first display screen;
dynamically modifying said selected first ROI based on said determined first ratio;
determining at least two zoom-in layers supported for said multimedia content based on said determined first ratio and a first stepsize value;
changing said first stepsize value of a first zoom-in layer subsequent to a specific number of zoom-in layers of said at least two zoom-in layers, to a second stepsize value based on a second user input;
determining a third resolution based on said determined first ratio and said second resolution; and
generating a zoom-in window for a second zoom-in layer of said determined at least two zoom-in layers, to display said selected first ROI at said third resolution.

2. The method according to claim 1,
wherein said first resolution is defined by a first distinct number of pixels along a first width $P_{w1}$ and a second distinct number of pixels along a first height $P_{h1}$ of said multimedia content, and
wherein said second resolution is defined by a third distinct number of pixels along a second width $P_{w2}$ and a fourth distinct number of pixels along a second height $P_{h2}$ of said first display screen.

3. The method according to claim 2, wherein said determined first ratio of said first resolution to said second resolution corresponds to one of:
a second ratio of said first width $P_{w1}$ of said first resolution to said second width $P_{w2}$ of said second resolution, or
a third ratio of said first height $P_{h1}$ of said first resolution to said second height $P_{h2}$ of said second resolution.

4. The method according to claim 1, further comprising rendering said zoom-in window on a first area of said first display screen, wherein said first area is larger than a second area of said generated zoom-in window.

5. The method according to claim 4, further comprising rendering said zoom-in window on said first area of said first display screen.

6. The method according to claim 1, further comprising rendering said zoom-in window on a second display screen of a second display device.

7. The method according to claim 6, further comprising determining a second ratio of said first resolution of said multimedia content to a fourth resolution of said second display screen.

8. The method according to claim 1, further comprising rendering said multimedia content in at least one zoom-in layer of said determined at least two zoom-in layers based on said first user input and a third user input subsequent to said first user input.

9. The method according to claim 8, wherein said third user input enables selection of a second ROI on said multimedia content rendered on said at least one zoom-in layer of said determined at least two zoom-in layers.

10. The method according to claim 9, further comprising determining a second ratio for a third zoom-in layer of said determined at least two zoom-in layers, wherein said second ratio is determined based on said determined first ratio and said first stepsize value.

11. The method according to claim 10, wherein said determined second ratio is based on a difference between said determined first ratio and said first stepsize value.

12. The method according to claim 1, further comprising rendering a notification on said first display screen based on a determination that said first ratio is less than 1.

13. The method according to claim 1, further comprising determining said first stepsize value based on said determined first ratio.

14. The method according to claim 1, further comprising:
displaying a navigation icon on said first display device, wherein said navigation icon displays a number of zoom-in layers in said determined at least two zoom-in layers supported for said multimedia content and a current zoom-in layer of said multimedia content.

15. A system, comprising:
a display device that includes at least one processor and a display screen, wherein said at least one processor is configured to:
- determine a ratio of a first resolution of multimedia content to a second resolution of said display screen;
- receive at least one user input to select a region of interest (ROI) on said multimedia content that is rendered on said display screen;
- dynamically modify said selected ROI based on said determined ratio;
- determine at least two zoom-in layers supported for said multimedia content based on said determined ratio and a first stepsize value;
- change said first stepsize value of a first zoom-in layer subsequent to a specific number of zoom-in layers of said at least two zoom-in layers, to a second stepsize value based on a second user input;
- determine a third resolution based on said determined ratio and said second resolution; and
- generate a zoom-in window for a second zoom-in layer of said determined at least two zoom-in layers, to display said selected ROI at said third resolution.

16. The system according to claim 15, wherein said first resolution is greater than said second resolution.

17. A system, comprising:
at least one processor in an online application server communicably connected to a display device, wherein said display device includes a display screen, and wherein said at least one processor is configured to:
- determine a ratio of a first resolution of multimedia content to a second resolution of said display screen;
- receive at least one user input to select a region of interest (ROI) on said multimedia content that is rendered on said display screen;
- dynamically modify said selected ROI based on said determined ratio;
- determine at least two zoom-in layers supported for said multimedia content based on said determined ratio and a first stepsize value;
- change said first stepsize value of a first zoom-in layer subsequent to a specific number of zoom-in layers of said at least two zoom-in layers, to a second stepsize value based on a second user input;
- determine a third resolution based on said determined ratio and said second resolution; and
- generate a zoom-in window for a second zoom-in layer of said determined at least two zoom-in layers, to display said selected ROI at said third resolution.

18. A non-transitory computer-readable medium having stored thereon computer-executable instructions that, when executed by a processor, cause said processor to execute operations, said operations comprising:
in a display device that includes a display screen:
- determining a ratio of a first resolution of multimedia content to a second resolution of said display screen;
- receiving at least one user input to select a region of interest (ROI) on said multimedia content, wherein said multimedia content is rendered on said display screen;
- dynamically modifying said selected ROI based on said determined ratio;
- determining at least two zoom-in layers supported for said multimedia content based on said determined ratio and a first stepsize value;
- changing said first stepsize value of a first zoom-in layer subsequent to a specific number of zoom-in layers of said at least two zoom-in layers, to a second stepsize value based on a second user input;
- determining a third resolution based on said determined ratio and said second resolution; and
- generating a zoom-in window for a second zoom-in layer of said determined at least two zoom-in layers, to display said selected ROI at said third resolution.

* * * * *